United States Patent Office 3,475,764
Patented Oct. 28, 1969

3,475,764
METHOD OF MANUFACTURING β-IONONE
Jan Pot, Van Houtenlaan, Weesp, Netherlands, assignor, by mesne assignments, to U.S. Philips Corporation, New York, N.Y., a corporation of Delaware
No Drawing. Filed Oct. 24, 1967, Ser. No. 677,773
Claims priority, application Netherlands, Oct. 26, 1966, 6615125
Int. Cl. C07c 49/61
U.S. Cl. 260—587                              4 Claims

ABSTRACT OF THE DISCLOSURE

Pseudo-ionone cyclized to β-ionone by sulfuric acid in the presence of liquid sulfur dioxide. The temperature of the reaction is controlled by evaporation of said sulfur dioxide.

---

This invention relates to a method of manufacturing β-ionone in which pseudo-ionone is cyclized by means of sulphuric acid.

It is known that in the cyclization of pseudo-ionone a mixture of α- and β-ionones is obtained. The ratio of the quantities in which these compounds are obtained is strongly depenent on the circumstances under which the reaction is carried out.

A very important factor is the reaction temperature. Thus British patent specification 843,751, in which the clyclization of pseudo-ionone in a heterogenous system built up of sulphuric acid and a liquid saturated hydrocarbon is described, mentions that a reaction at −20 to 0° C. yields predominantly β-ionone and at −10 to +25° C. predominantly α-ionone.

The cyclisation reaction is strongly exothermal. Consequently, in order to manufacture predominantly β-ionone not only the reactants must be cooled to temperatures below 0° C. but also the reaction heat must be dissipated instantaneously. A very cold cooling medium must therefore be used which require the use of a large quantity of expensive frigories in addition to a costly apparatus, or the reactants must be mixed together so slowly that only little heat is produced per unit time in a reaction medium of large volume. In the latter case a less complicated cooling apparatus or a less cold cooling medium may be used.

Another important factor is the composition of the reaction medium. In principal the reaction may be carried out in 100% sulphuric acid. The reaction mixture is then, however, too viscous to obtain a good mixture of the reactants. In addition oxidation and sulfonation may occur as side reactions. It is therefore desirable to dilute the sulphuric acid with a suitable solvent. E. E. Royals, Ind. Eng. Chem., 38, 546–548 (1946) has shown that with strong dilution of sulphuric acid by polar solvents such as water and acetic acid both the yield of ionone and the content of β-ionone therein strongly decrease. Krishna J. Org. Chem., 22, 224–225 (1957) confirms this but shows that the dependency of the yield of β-ionone upon the degree of dilution is still greater than Royals has found. Consequently, according to British patent specification 843,751, 93–100% sulphuric acid is used for the manufacture of β-ionone, while according to Dutch patent application 298,958 93–98% sulphuric acid diluted with 7½–10% by weight of lower aliphatic alcohol is used.

Thus it could not be expected that a high yield of β-ionone is obtainable from pseudo-ionone in a medium containing, in addition to sulphuric acid, an amount by weight of a polar solvent which is up to several times greater.

Thus it was a surprise to find that if the polar sulphur dioxide is used to dilute sulphuric acid to such a strong extent, pseudo-ionone can be cyclized to form β-ionone in that medium.

The use of sulphur dioxide also gives a surprising simplification and saving in adjusting and maintaining the desired temperature of reaction. The reactants can now be brought to the desired low temperature in a simple manner by mixing them with liquid sulphur dioxide of, for example, room temperature, in which process the sulphur dioxide evaporates, while the reaction mixture can be maintained at the selected temperature, i.e., a temperature between the boiling point of sulfur dioxide and room temperature in the same manner. The escaping gaseous sulphur dioxide can be collected and compressed, it being possible to dissipate the heat of condensation, for example, by using water or air of, for example, room temperature. The liquid sulphur dioxide can thereafter be recyclized.

In order to be able to work up the formed β-ionone by extraction with a suitable solvent, the reaction mixture is diluted with water according to the known methods. To prevent the temperature from increasing too much as a result of the hydration heat produced, the reaction mixture is poured out on ice or in ice water. If for the cyclization of pseudo-ionone use is made of the method described, then the manufacture can be effected in such manner that after completion of the reaction, sufficient sulphur dioxide to dissipate the hydration heat of the sulphuric acid is left in the mixture. Sulphur dioxide can alternatively be added prior to or during the pouring out in water.

It is therefore an advantage of the said method that frigories need not be used. Since sulphur dioxide is suitable to dilute sulphuric acid therewith and can therefore be brought into intimate contact with the reactants, it is a strong cooling agent. As a result thereof, the use of sulphur dioxide has the additional advantage of making it possible to mix the reactants rapidly and consequently to increase the rate of the reaction.

Sulphur dioxide has further the advantage over known diluents such as hydrocarbons that it is noninflammable. In addition the agent is cheap.

In conformity therewith the present invention relates to a method of manufacturing β-ionone in which pseudo-ionone is cyclised by means of sulphuric acid, and it is characterized in that the cyclization is carried out in the presence of sulphur dioxide.

It was found that the reaction can be carried out at temperatures which lie between the boiling point of sulphur dioxide and room temperature. In conformity with what is known, it was, however, found that the yield of β-ionone decreases at higher temperatures. The reaction is therefore preferably carried out at temperatures between −10° C. and +10° C.

The concentration of the sulphuric acid was found to be allowed to vary rather strongly. The use of 90% to 98% sulphuric acid gave satisfactory results. For practical reasons 95%–96% sulphuric acid is, however, preferred.

Also the ratio between the quantities of sulphuric acid and pseudo-ionone may vary considerably. In general 200 mls. to 800 mls. of sulphuric acid preferably 400 mls. to 600 mls. are used per mol of pseudo-ionone.

The method may be used for manufacture of β-ionone in batches but lends itself also excellently for continuous manufacture.

The reaction mixture may be worked up by pouring it out in water whereafter the β-ionone is extracted with a suitable solvent. It is, however, also possible to work up by pouring out in a mixture of water and a solvent, for example, petroleum ether.

The reaction time is of little influence on the yield of β-ionone. In general said time lies between 1 and 10 minutes, as a rule between 3 and 7 minutes.

EXAMPLE 1

50 mls. of liquid sulphur dioxide were added to 50 mls. of 95% sulphuric acid at room temperature, while stirring, whereupon the temperature decreased to between −4° C. and −5° C. Subsequently 19.0 gms. of pseudo-ionone (content 94%) and 150 mls. of liquid sulphur dioxide of room temperature were simultaneously added to the sulphuric acid through a wide-necked funnel. Subsequently there was additional stirring for 5 minutes. The temperature of the reaction mixture remained below 0° C.

The reaction mixture was subsequently poured out into 100 mls. of water of room temperature, the sulphur dioxide still present cooling the mixture. The mixture was subsequently extracted twice with 100 mls. of petroleum ether, boiling point 40°–60° C., whereafter the collected extracts were washed with a 10% sodium carbonate solution and then with a saturated sodium chloride solution. After the extract was dried, the solvent was removed by distilling at reduced pressure. Yield of ionone 18.0 gms. Content of β-ionone 95.4% (calculated from U.V.-spectrum) content of α-ionone 0.5%–1% (determined by means of thin-layer chromatography).

EXAMPLE 2

250 mls. of liquid sulphur dioxide were added to 140 mls. of 90% sulphuric acid at room temperature whereupon the temperature decreased to between −8° C. and −9° C. 62 gms. of pseudo-ionone (content 93%) and 400 mls. of liquid sulphur dioxide of room temperature were added through a wide-necked funnel, whereafter there was additional stirring for 5 minutes. The reaction temperature remained below 0° C. The reaction mixture was subsequently poured out in 300 mls. of water, the sulphur dioxide still present cooling the mixture. The mixture was extracted twice with 300 mls. of petroleum ether, boiling point 40° C.–60° C. The extracts were mixed together, washed with a 10% sodium carbonate solution and a saturated sodium chloride solution and subsequently dried. After evaporation of the solvent 57 gms. ionone resulted consisting for 96% of β-ionone, for less than ½% of α-ionone.

EXAMPLE 3

In a manner identical to the method described in Example 2, ionone was manufactured in a yield of 92%, content β 95.8%, content α less than 1%, in a medium of 92% sulphuric acid.

EXAMPLES 4 UP TO AND INCLUDING 15

Sulphuric acid, pseudo-ionone and liquid sulphur dioxide, all of room temperature, were continuously led into a reaction vessel through separate channels which terminated near the bottom of the vessel. The cylindrical vessel was provided with a stirrer, a chimney for the removal of gaseous sulphur dioxide and an overflow to a work-up vessel. The volume of the reaction mixture was 65 mls.

Water, petroleum ether, boiling point 40° C.–60° C. and sulphur dioxide, all or room temperature, were added continuously in the work-up vessel. The work-up vessel was also provided with a stirrer, chimney and overflow. The outflowing liquid was separated, washed and dried analogous to the manner described in the preceding examples. After evaporation of the solvent, the yield and the content were determined. The results are given in the following table:

TABLE

| Example No.: | 95% of $H_2SO_4$ mls./hour | ψ-Ionone gms./hour | Content in percent of ψ-Ionone | $SO_2$ in container Akgs./hour | Yield in gms. of ionone | Content in percent of β-Ionone | Content in percent of α-Ionone | Temperature in °C. |
|---|---|---|---|---|---|---|---|---|
| 4 | 500 | 196 | 94 | 1 | 182 | 96 | <0.5 | −7 |
| 5 | 500 | 198 | 94 | 1.2 | 182 | 96 | <0.5 | −9 |
| 6 | 500 | 202 | 94 | 0.6 | 188 | 92 | <1 | +10 |
| 7 | 500 | 202 | 94 | 0.5 | 184 | 81 | 2–3 | +18 |
| 8 | 300 | 204 | 94 | 1.2 | 192 | 93 | 1–1.5 | −9 |
| 9 | 600 | 202 | 94 | 1.2 | 184 | 97 | <1 | −9 |
| 10 | 500 | 202 | 84 | 1.3 | 176 | 91 | 0.5–1.5 | −9 |
| 11 | 700 | 200 | 84 | 1.2 | 182 | 89 | 0.5–1 | −8 |
| 12 | 1,000 | 408 | 94 | 2.0 | 372 | 92 | 1.5–2 | −9/−10 |
| 13 | 250 | 102 | 84 | 0.7 | 93 | 94 | 1–1.5 | −9 |
| 14 | ¹ 500 | 202 | 84 | 1.2 | 180 | 90 | <1 | −9 |
| 15 | 500 | 190 | 94 | ² 2.5 | 182 | 96 | <1 | −9/−10 |

¹ 98% of sulphuric acid.
² Very large excess of $SO_2$ used.

What is claimed is:
1. The method of manufacturing β-ionone comprising cyclizing pseudo-ionone with a mixture consisting essentially of about 200 to 800 ml. of 90% to 98% sulfuric acid per mol of the pseudo-ionone said cyclization being carried out in the presence of sufficient liquid sulfur dioxide so that a temperature between the boiling point of sulfur dioxide and room temperature is maintained by evaporation of said sulfur dioxide.
2. The method of claim 1 wherein the cyclization is carried out at a temperature between about −10° C. and +10° C.
3. The method of claim 1 wherein the cyclization is carried out continuously.
4. The method of claim 1 wherein after the reaction is completed the reaction mixture is diluted with water and liquid sulfur dioxide.

References Cited

FOREIGN PATENTS 1,030,946   5/1966   Great Britain.

BERNARD HELFIN, Primary Examiner

M. M. JACOBS, Assistant Examiner